United States Patent Office 3,239,566
Patented Mar. 8, 1966

3,239,566
HYDROFORMYLATION OF OLEFINS
Lynn H. Slaugh, Pleasant Hill, and Richard D. Mullineaux, Oakland, Calif., assignors to Shell Oil Company, New York, N.Y., a corporation of Delaware
No Drawing. Filed July 8, 1963, Ser. No. 293,251
7 Claims. (Cl. 260—604)

This application is a continuation-in-part of copending application, Serial No. 46,071, filed July 29, 1960, now abandoned.

This invention relates to the production of aldehydes and/or alcohols from olefinically unsaturated compounds. The invention relates more particularly to the production of aldehydes and/or alcohols by the addition of carbon monoxide and hydrogen to olefinic hydrocarbons in the presence of an improved catalyst.

Processes directed to the production of reaction mixtures comprising substantial amounts of aldehydes and at times lesser amounts of alcohols by the reaction of olefinic compounds with carbon monoxide and hydrogen at elevated temperatures and pressures in the presence of certain catalysts are well known in the art. The aldehydes and alcohols produced generally correspond to the compounds obtained by the addition of a carbonyl or carbinol group to an olefinically unsaturated carbon atom in the starting material with simultaneous saturation of the olefin bond. Isomerization of the olefin bond may take place to varying degrees under certain conditions with the consequent variation in the products obtained. These processes known in the industry and referred to herein as hydroformylation, involve reactions which may be shown in the general case by the following equation:

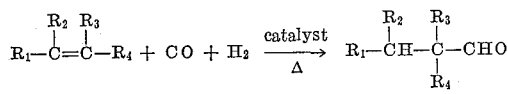

and/or

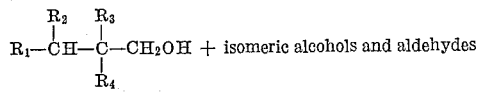

In the above equation, each R represents an organic radical, for example hydrocarbyl, or suitable atom such as hydrogen or a halogen. The above reaction is similarly applied to an olefinic linkage in a cycloaliphatic ring.

A disadvantage of hydroformylation processes disclosed heretofore is their dependence upon the use of catalyst, such as dicobalt octacarbonyl, which generally necessitate the use of exceedingly high pressures to remain stable under the conditions therein employed. A further disadvantage of many of the processes disclosed heretofore is their inability to produce hydroformylation products comprising substantial amounts of alchols, thereby necessitating a separate aldehyde hydrogenation step when alcohols are a desired product. The production of hydroformylation products having a relatively high normal to branched product isomer ratio is often also exceedingly difficult if at all possible in many of the practical scale processes heretofore disclosed.

It is therefore an object of the present invention to provide an improved hydroformylation process enabling the more efficient production of aldehydes and/or alcohols by the catalytic reaction of olefinic compounds with carbon monoxide and hydrogen.

Another object of the present invention is the provision of an improved hydroformylation process enabling the more efficient production of aldheydes and/or alcohols by reaction of olefinic compounds with carbon monoxide and hydrogen in the presence of an improved hydroformylation catalyst.

Still another object of the present invention is the provision of an improved hydroformylation process enabling the more efficient single stage production of aldehyde and alcohols by the reaction of olefinic hydrocarbons with carbon monoxide and hydrogen in the presence of an improved catalyst enabling the use of substantially lower pressures than generally possible heretofore. Other objects and advantages of the present invention will become apparent from the following detailed description thereof.

In accordance with the present invention, olefinic compounds are converted to saturated aldehydes and/or alcohols having one more carbon atom than the olefinic compounds by reacting the olefinic compounds in liquid phase, with carbon monoxide and hydrogen, at a temperature of from about 100° to about 300° C. in the presence of a catalyst comprising ruthenium and/or rhodium in complex combination with carbon monoxide and a phosphorus-containing ligand consisting essentially of a tertiary organo phosphorus compound in which the phosphorus is trivalent (referred to herein as phosphines).

In its active form, the suitable complex catalysts will contain the ruthenium or rhodium component in a reduced valence state. As used throughout this specification and claims, the term "complex" means a coordination compound formed by the union of one or more electronically rich molecules or atoms capable of independent existence with one or more electronically poor molecules or atoms, each of which is also capable of independent existence.

In the suitable ligands containing trivalent phosphorus comprised in the complex catalyst employed in the process of the invention, the phosphorus atom has one available or unshared pair of electrons. Any essentially organic derivative of trivalent phosphorus with the foregoing electronic configuration is a suitable ligand for the ruthenium- or rhodium-containing catalysts of the present invention. When trivalent phosphorus has such an electronic configuration, it is capable of forming a coordinate bond with these metals. It will thus operate as a ligand in forming the desired ruthenium and rhodium complexes used as catalysts in the present invention.

Organic radicals of any size and composition may be bonded to the phosphorus atom. Contemplated within the scope of this invention, therefore, are trivalent phosphorus compounds having aliphatic, and/or cycloaliphatic, and/or heterocyclic, and/or aromatic radicals satisfying its three valences. These radicals may contain a functional group such as the carbonyl, carboxyl, nitro, amino, hydroxy functional groups, saturated or unsaturated carbon-to-carbon linkages, as well as saturated and unsaturated noncarbon-to-carbon linkages.

It is also suitable for an organic radical to satisfy more than one of the valences of the phosphorus atom, thereby forming a heterocyclic compound with a trivalent phosphorus atom. For example, an alkylene radical may satisfy two phosphorus valences with its two open valences and thereby form a cyclic compound. Another example would be the alkylene dioxy radical to form a cyclic compound where oxygen atoms link an alkylene radical to the phosphorus atom. In these two examples, the third phosphorus valence may be satisfied by any other organic radical.

Another type of structure involving trivalent phosphorus having an available pair of electrons are those containing a plurality of such phosphorus atoms linked by organic radicals. This type of a compound is called a bidentate ligand when two such phosphorus atoms are present, a tridentate ligand when three such phosphorus atoms are present, and so forth. Examples of these polydentate ligands include such structures as:

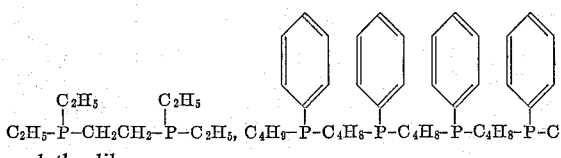

and the like.

Suitable catalysts within the scope of those employed in the process of the invention include the complexes consisting essentially of a metal selected from the group consisting of ruthenium and rhodium in complex combination with both carbon monoxide and a tertiary organophosphine of the formula $PR_3$ wherein R is an organic radical. Each R in the formula $PR_3$ may represent, for example, a hydrocarbyl group, such as alkyl (including cycloalkyl) alkaryl, aralkyl; and the like. The phosphorus-containing ligand ($R_3P$) component of the complex catalyst may thus suitably be tertiary phosphine, such as a trialkyl phosphine, a trialkarylphosphine, a triarylphosphine, and the like. The hydrocarbyl components, R, need not necessarily be the same and suitable tertiary organophosphine ligands comprise the mixed phosphines wherein two or more of the three substituent R's are different members of the groups comprising alkyls, aralkyls, alkaryls, and the like. As indicated above, the substituent R's may contain oxygen, halogen (preferably middle halogen) or sulfur atoms. Preferred catalysts of the above-defined class comprise those wherein each R contains from 1 to 20 carbon atoms, and the total number of carbons in the tertiary organophosphine ($R_3P$) group does not exceed about 30. A particularly preferred group of catalysts with the above-defined class are the trialkylphosphine-rhodium-carbonyl complexes and trialkylphosphine-ruthenium-carbonyl complexes wherein the phosphorus-containing component of the catalyst is a trialkylphosphine in which each alkyl is a lower alkyl having from 1 to 10 carbons of straight or branched chain structure.

Specific examples of suitable catalysts of the above-defined class comprise complexes between rhodium or ruthenium, carbon monoxide, and one of the following organophosphines:

Trimethylphosphine
Triethylphosphine
Tri-n-butylphosphine
Triamylphosphines
Trihexylphosphines
Tripropylphosphine
Trinonylphosphines
Tridecylphosphines
Triethylhexylphosphine
Di-n-butyl octadecylphosphine
Dimethyl-ethylphosphine
Diamylethylphosphine
Tris(dimethylphenyl)phosphine
Ethyl-bis(beta-phenylethyl)phosphine
Tricyclopentylphosphine
Tricyclohexylphosphine
Dimethyl-cyclopentylphosphine
Tri-octylphosphine
Dicyclohexylmethylphosphine
Phenyldiethylphosphine
Dicyclohexylphenylphosphine
Diphenyl-methylphosphine
Diphenyl-butylphosphine
Diphenyl-benzylphosphine
Trilaurylphosphine
Triethoxyphosphine
n-Butyl-diethoxyphosphine Of these catalysts those containing the metal in complex combination with carbon monoxide and a triacyclic aliphatic phosphine or a trialicyclic aliphatic (cycloalkyl) phosphine are somewhat preferred. A particularly preferred catalyst comprises rhodium-carbonyl-tri-n-butyl phosphine complex.

The above-defined complexes, used as catalysts in the process of this invention may be prepared by a diversity of methods. A convenient method is to combine an organic or inorganic salt of rhodium or ruthenium with the desired phosphorus-containing ligand, for example, a triorganophosphine such as a trialkylphosphine in liquid phase. Suitable metal salts comprise, for example, the carboxylates such as acetates, octoates, etc., as well as mineral acid salts such as chlorides, sulfates, sulfonates, etc., of rhodium and ruthenium. The valence state of the metal may then be reduced and the metal-containing complex formed by heating the solution in an atmosphere of admixed hydrogen and carbon monoxide. The reduction may be preformed prior to the use of the catalysts or it may be accomplished simultaneously with the hydroformylation process of this invention. Complexes of the type defined which may comprise a residual portion of starting material or component thereof, for example, chlorine, in additional complex combination therewith, which may at times be formed as a product under the conditions defined herein for the preparation of the suitable complex catalysts, are comprised within the scope of the present invention.

When the catalyst is preformed, or prepared in situ, by heating a mineral acid salt of rhodium or ruthenium in admixture with a teritary organophosphine in the presence of both hydrogen and carbon monoxide, the resulting reaction mixture may be treated with a suitable agent capable of accepting or neutralizing acidic reaction byproducts. Thus, an alkaline material or the like may be added either prior to, during the course of, or directly after the preparation of the catalyst complex. A particularly suitable agent for this purpose comprises an alkali metal salt as a lower monocarboxylic acid such as, for example, sodium acetate.

Alternatively, the catalysts may be prepared from a carbon monoxide complex of the metal. For example, it is possible to start with a rhodium carbonyl and by heating this substance with a suitable phosphorus-containing ligand of the type previously described, for example, trialkylphosphine, the ligand will replace one or more of the carbon monoxide molecules, producing the desired catalyst.

In accordance with the invention, olefinic compounds are hydroformylated to reaction products predominating in aldehydes and/or alcohols by intimately contacting the olefinic compound in liquid phase with carbon monoxide and hydrogen in the presence of the above-defined catalysts comprising a complex of rhodium or ruthenium with a phosphorus-containing ligand and carbon monoxide at well-defined conditions of temperature and pressure.

An advantage inherent in the process of the invention resides in the ability of the catalyst to remain stable and exhibit high-activity for long periods of time at very low pressures. Consequently, hydroformylation in accordance with the present invention may be carried out at pressures well below 1000 p.s.i.g. to as low as 1 atmosphere or less. Under comparable conditions, catalysts of the prior art such as dicobalt octacarbonyl, often decompose and become inactive. The invention is, however, not limited in its applicability to the lower pressures and pressures in the broad range from atmospheric up to about 2000 p.s.i.g. and higher may be employed. The specific pressure preferably used will be governed to some extent by the specific charge and catalyst employed. In general, pressures in the range of from about 300 to about 1500 p.s.i.g. and particularly in the range of from about 400 to about 800 p.s.i.g. are preferred. The unique stability of the catalysts of the present invention at the lower pressures makes the use of pressures below about 1500 p.s.i.g. particularly desirable.

Temperatures employed will generally range from about 100° to about 300° C. and preferably from about 150° to about 210° C., a temperature of about 195° C. being generally satisfactory. Somewhat higher or lower temperatures may, however, be used within the scope of the invention.

The ratio of catalyst to the olefin to be hydroformylated is generally not critical and may vary widely within the scope of the invention. It may be controlled to obtain a substantially homogeneous reaction mixture. Solvents are therefore not essential. However, the use of solvents which are inert, or which do not interfere to any substantial degree with the desired hydroformylation reaction under the conditions employed, may be used within the scope of the invention. Saturated liquid hydrocarbons, for example, may be used as solvent in the process, as well as ketones, ethers, and the like. Ratios of catalyst to olefin between about 1:1000 and about 10:1 are found to be satisfactory; higher or lower catalyst to olefin ratios may, however, be used within the scope of the invention.

The ratio of hydrogen to carbon monoxide charged may vary widely within the scope of the invention. In general, a mole ratio of hydrogen to carbon monoxide of a least about 1 is employed. Suitable ratios of hydrogen to carbon monoxide comprise those within the range of from about 1 to about 10. Higher or lower ratios may, however, be employed within the scope of the invention. The ratio of hydrogen to carbon monoxide preferably employed will be governed to some extent by the nature of the reaction product desired. If conditions are selected that will result primarily in an aldehyde product, only one mole of hydrogen per mole of carbon monoxide enters into reaction with the olefin. When the alcohol is the desired product, two moles of hydrogen and one mole of carbon monoxide react with each mole of olefin. The minimum ratio of hydrogen to carbon monoxide employed will therefore generally be governed by the product desired. The use of ratios of hydrogen to carbon monoxide which are somewhat higher than those defined by these stoichiometrical values are generally preferred.

An advantage of the present invention as indicated above and further evidenced by the following examples is the ability to effect the direct, single stage hydroformylation of the olefins to a reaction mixture comprising substantial amounts of alcohols in addition to the aldehydes. By varying the operating conditions within the range described herein, the ratio of aldehyde to alcohol product may be varied somewhat. Adjustment of these variables also permits some control over the particular isomer that will be produced.

A valuable aspect of the invention resides in its ability to effect the direct, single stage hydroformylation of internal normal olefins, having for example, from 4 to 19 carbon atoms to the molecule to normal terminal alcohols having 5 to 20 carbon atoms to the molecule, respectively. Olefinic hydrocarbon fractions, such as, for example, polymeric olefinic fractions, cracked wax fractions, and the like, containing substantial proportions of internal olefins are readily hydroformylated to fractions of hydroformylated products comprising mixtures of terminal aldehydes and alcohols having one more carbon than the olefins in the charge and wherein these alcohols are the predominant reaction product. Such suitable feeds consisting of olefinic hydrocarbon fractions include, for example, $C_7$, $C_8$, $C_9$, $C_{10}$ and higher olefinic fractions as well as olefinic hydrocarbon fractions of wider boiling ranges such as $C_{7-9}$, $C_{10-13}$, $C_{12-16}$, $C_{14-17}$ olefinic hydrocarbon fractions and the like.

Under the above-defined conditions, the olefinic charge will react with carbon monoxide and hydrogen with the formation of reaction products comprising aldehydes and/or alcohols having one more carbon atom per molecule than the olefin charged.

The reaction mixtures obtained may be subjected to suitable catalyst and product separating means comprising one or more such steps, for example, as stratification, solvent extraction, distillation, fractionation, adsorption, etc. Catalyst, or components thereof, as well as unconverted charge, solvent, etc., may be recycled, in part or entirely, to the reaction zone.

The process of this invention is generally applicable to the hydroformylation of any aliphatic or cycloaliphatic compound having at least one ethylenic carbon-to-carbon bond. Thus, it is applied to the hydroformylation of olefins having, for example, from 2 to 19 carbons to reaction mixtures predominating in aliphatic aldehydes and alkanols having one more carbon atom than the starting olefin. The invention is used to advantage in the hydroformylation of carbon-to-carbon ethylenically unsaturated linkages in hydrocarbons. Monoolefins such as ethylene, propylene, butylene, pentenes, hexenes, heptenes, octenes, dodecenes, their homologues, etc., are a few examples of suitable hydrocarbons. Suitable hydrocarbons include both branched- and straight-chain compounds having one or more of these ethylenic or olefinic sites. These sites may be conjugated, as in 1,3-butadiene, or non-conjugated, as in 1,5-hexadiene. In the case of polyolefins, it is possible to hydroformylate only one of the olefinic sites or several or all of these sites. The unsaturated carbon-to-carbon olefinic linkages may be between terminal and their adjacent carbon atoms, as in 1-pentene, or between internal chain carbon atoms, as in 4-octane.

Hydroformylation of macromolecular materials involving acyclic units of the above types such as polydiolefins like polybutadiene, as well as copolymers of olefins and diolefins like the styrenebutadiene copolymer, is also comprised within the scope of the invention.

Hydrocarbon cyclic compounds are equally suitable for use in this invention. This group includes the unsaturated alicyclic hydrocarbons such as the cylic olefins containing carbon-to-carbon unsaturation such as the cycloalkenes like cyclopentene, cylohexene, cycloheptene, and 1,5-cyclooctadiene. Also included in this category are the terpenes and fused-ring polycyclic olefins, such as 2,5-bicyclo(2,2,1)-heptadiene, 1,4,4a,5,8,8a-hexahydro-1,4,5,8-dimethanonaphthalene and the like.

The process of this invention may also be used to hydroformylate ethylenic carbon-to-carbon linkages of nonhydrocarbons. Thus, it is possible to hydroformylate olefinically unsaturated alcohols, aldehydes and acids to corresponding alcohols, aldehydes, and acids containing an aldehyde or hydroxy group on one of the carbon atoms previously involved in the olefinic bond of the starting material. The following are a few specific examples of different types of olefinic compounds that may be hydroformylated in accordance with the invention and the products obtained thereby:

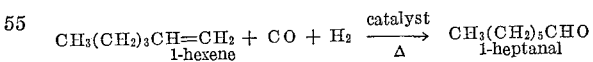

and/or $CH_3(CH_2)_5CH_2OH$ + isomeric products
1-heptanol

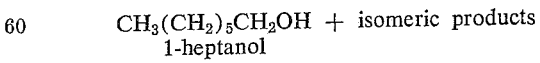

and/or $ClCH_2CH_2CHO$ + isomeric products
3-chloropropanal

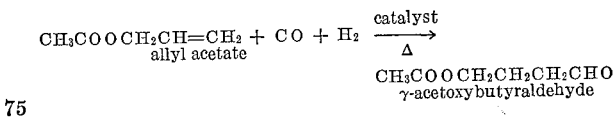

and/or

CH₃COOCH₂CH₂CH₂CH₂OH + isomeric products
Δ-acetoxybutanol

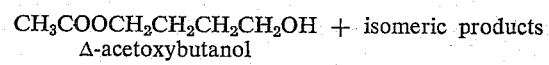

and/or

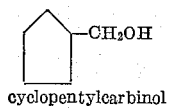

cyclopentylcarbinol

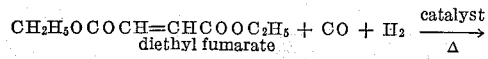

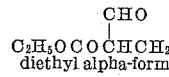

diethyl alpha-formylsuccinate and/or

C₂H₅OCOCHCH₂COOC₂H₅
         |
         CH₂OH
diethyl alpha-methylolsuccinate

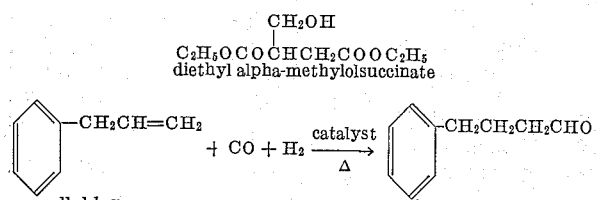

and/or

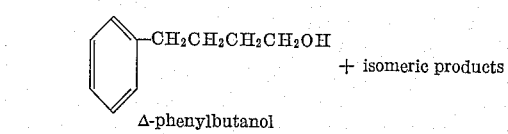

+ isomeric products

Δ-phenylbutanol

The olefinic charge to the process of the invention may comprise two or more of the above-defined suitable olefins. Olefinic hydrocarbon fractions are hydroformylated under the conditions above-defined to mixtures of aldehydes and alcohols in which the alcohols predominate.

The following examples are illustrative of the process of this invention.

EXAMPLE I

Pentene, taken as a typical olefin, was hydroformylated by reaction with carbon monoxide and hydrogen in the presence of a catalyst consisting of rhodium in complex combination with carbon monoxide and tributylphosphine in a reactor comprising a 100-ml. stainless-steel autoclave, provided with magnetic stirrer, connected to a 0-1000 p.s.i.a. transducer and to a source of a premixed hydrogen-carbon monoxide gas. The volume of the external fittings was kept to a minimum to provide a maximum sensitivity of pressure to the charge in number of millimoles of hydrogen and carbon monoxide present. The catalyst complex was prepared in situ by bringing together rhodium chloride and tri-n-butylphosphine in the presence of a solvent and heating in an atmosphere comprising both carbon monoxide and hydrogen to about 195° C., thereby forming the cobalt-carbonyl-tri-(n-butyl) phosphine complex. The presence of the complex catalyst was indicated by analysis.

In a Run A, 64 mmoles of pentene, 20 ml. of octane (solvent), 4 mmoles of tri-n-butylphosphine and 2 mmoles RhCl₃ and 12 mmoles sodium acetate were charged to the reactor. A Teflon magnetic stirring bar was added. The reactor was closed, cooled, evacuated, flushed with H₂-CO gas and then pressured with admixed hydrogen-carbon monoxide gas containing a mole ratio of hydrogen to carbon monoxide of 2.1. The autoclave was then heated to 195° C. by an external heater. (The resulting reaction mixture contained rhodium-carbonyl-n-butylphsphine complex, containing a mole ratio of tri-n-butylphosphine to rhodium of 2, in a concentration of 0.07 mole per liter.

The heating at the temperature of 195° C. under CO-H₂ pressure was continued for 12 hours. The maximum pressure attained in the reactor was about 450 p.s.i.g. Stirring of the autoclave contents was effected by the Teflon-covered stirring bar inside the autoclave which was set in motion by an external magnetic stirring motor. The pressure decrease resulting from consumption of hydrogen and carbon monoxide was recorded on a Daystrom recorder. At the end of the 12-hour period, the reactor was cooled and the contents analyzed. The results obtained are given in the following Table A.

In a Run B, the foregoing Run A was repeated under substantially identical conditions but with the exception that the tri-n-butylphosphine was omitted from the charge. The results obtained are given in the following Table A.

In two separate runs, C and D, the Run A was repeated under substantially identical conditions but with the exception that the reaction time was reduced to 2.5 hours for Run C and 4 hours for Run D. The results obtained are given in the following table A:

Table A

| Run | A | B | C | D |
| --- | --- | --- | --- | --- |
| Catalyst | Rhodium-carbonyl-tri-n-butyl-phosphine complex | RhCl₃ | Rhodium-carbonyl-tri-n-butyl-phosphine complex | Rhodium-carbonyl-tri-n-butyl-phosphine complex |
| Conversion percent | 84.8 | <5 | 99.4 | 65.3 |
| Selectivity percent to: | | | | |
| C₆ aldehydes | 59.9 | | 93.0 | 96.4 |
| C₆ alcohols | 24.9 | | 5.4 | 2.9 |
| Product Isomer Distribution: | | | | |
| n-Hexyl | 59.8 | | 72.1 | 70.8 |
| Branched-hexyl | 40.2 | (¹) | 27.9 | 29.2 |
| Catalyst Stability | Stable | (²) | Stable | Stable |

¹ Insufficient product to enable accurate determination.
² Complete decomposition.

EXAMPLE II

A rhodium-carbonyl-tri-n-butylphosphine complex is prepared by heating at a temperature of 150° C. in an atmosphere of admixed hydrogen-carbon monoxide gas (CO:H₂=2.1 mole ratio): rhodium chloride (RhCl₃), tri-n-butylphosphine, sodium acetate, and n-hexane as solvent, in a mole ratio of RhCl₃: n-Bu₃P:CH₃COONa of 1:8:8, respectively. The resulting reaction mixture, containing rhodium corbonyl-tri-n-butylphosphine having a nBu₃P/Rh ratio of 8, is charged to a reactor. There is added 1-butylene and additional hexane as solvent to result in a reaction mixture containing 2.3 moles of 1-butylene and 0.07 mole of the catalyst complex per liter of total reaction mixture. The reaction mixture is heated at 195° C., with stirring, under a pressure of admixed carbon monoxide and hydrogen (H₂/CO molar ratio— 2.1) for a period of 12 hours. The maximum pressure attained is 475 p.s.i.g. Thereafter, the reactor is cooled and the contents analyzed. There is obtained a conversion of 1-butene of 90% with a selectivity to total formylation products of 93% consisting predominantly of n-pentanal.

EXAMPLE III 1-pentene was hydroformylated in the presence of rutheniumcarbonyl-tri-n-butylphosphine complex and octane as solvent, under a carbon monoxide-hydrogen pressure of 450 p.s.i.g. at 195° C. The reaction mixture contained 0.07 mole per liter of the ruthenium-carbonyl-tri-n-butylphosphine complex 0.35 mole of sodium acetate per liter of reaction mixture, and 2.3 moles of 1-pentene per liter. (The catalyst complex was obtained by heating RuCl₃ and tri-n-butylphosphine in a mole ratio of n-Bu₃P to RuCl₃ of 2 in an atmosphere of carbon monoxide and hydrogen.) There was obtained a 1-pentene conversion of 93.6%; the hydroformylation products consisting essentially of C₆ alcohols, 61% of which was n-hexanol.

EXAMPLE IV

Similarly, the following olefinic compounds are hydroformylated to hydroformylation products consisting of aldehydes and alcohols having one more carbon atom to the molecule than the olefinic charge, in the presence of the complex catalysts and under the reaction conditions set forth in the foregoing Examples I through II.

| | |
|---|---|
| Propylene | Cyclohexane |
| 1-butene | Dodecene |
| 2-pentene | $C_{12-14}$ olefinic hydrocarbon fraction |
| Isobutylene | |
| 2-me-1-pentene | |

We claim as our invention:

1. The process for the production of aldehydes and alcohols, which comprises contacting a mono-olefinic hydrocarbon with carbon monoxide and hydrogen, at a temperature of from about 100° to about 300° C., in the presence of a complex catalyst consisting essentially of a metal selected from the group consisting of ruthenium and rhodium in complex combination with carbon monoxide and a trialkylphosphine, thereby reacting said mono-olefinic hydrocarbon with said carbon monoxide and hydrogen with the formation of aldehydes and alcohols having one more carbon atom than the mono-olefinic hydrocarbon.

2. The process for the production of aldehydes and alcohols which comprises contacting a mono-olefinic hydrocarbon with carbon monoxide and hydrogen at a temperature of from about 100° to about 300° C., and a pressure of from about 1 atmosphere to about 2000 p.s.i.g., in the presence of a complex catalyst consisting essentially of a metal selected from the group consisting of ruthenium and rhodium in complex combination with carbon monoxide and a trialkylphosphine, thereby reacting said mono-olefinic hydrocarbon with said carbon monoxide and hydrogen with the formation of aldehydes and alcohols having one more carbon atom than said mono-olefinic hydrocarbon.

3. The process for the production of aldehydes and alcohols which comprises contacting a mono-olefinic hydrocarbon with carbon monoxide and hydrogen at a temperature of from about 100° to about 300° C., and a pressure of from about 1 atmosphere to about 2000 p.s.i.g. in the presence of a complex catalyst consisting essentially of rhodium in complex combination with carbon monoxide and a trialkylphosphine, thereby reacting said mono-olefinic hydrocarbon with said carbon monoxide and hydrogen with the formation of aldehydes and alcohols having one more carbon atom than said mono-olefinic hydrocarbon.

4. The process for the production of oxygenated hydrocarbons consisting essentially of aliphatic aldehydes and alcohols, which comprises contacting a mono-olefinic hydrocarbon with carbon monoxide and hydrogen at a temperature of from about 100° to about 300° C., and a pressure of from about 1 atmosphere to about 1500 pounds, in the presence of a catalyst consisting essentially of a metal selected from the group consisting of ruthenium and rhodium in complex combination with carbon monoxide and a trialkylphosphine wherein each alkyl group contains from 1 to 20 carbons, thereby reacting said mono-olefinic hydrocarbon with carbon monoxide and hydrogen with formation of aliphatic aldehydes and alcohols having one more carbon atom to the molecule than said mono-olefinic hydrocarbon.

5. The process for the production of aliphatic aldehydes and alcohols having for 3 to 20 carbon atoms to the molecule which comprises reacting a mono-olefinic hydrocarbon having from 2 to 19 carbon atoms to the molecule with carbon monoxide and hydrogen at a temperature of from about 100° to about 300° C., and a pressure of from about 1 atmosphere to about 1500 p.s.i.g., in the presence of a complex catalyst consisting essentially of rhodium in complex combination with carbon monoxide and a trialkylphosphine wherein each alkyl group has from 1 to 20 carbon atoms.

6. The process in accordance with claim 5 wherein said complex catalyst is rhodium carbonyl tri-n-butylphosphine.

7. The process for the production of reaction products consisting essentially of aliphatic aldehydes and alcohols having six carbon atoms to the molecule, which comprises reacting a pentene with carbon monoxide and hydrogen at a temperature of from about 100 to about 300° C., and a pressure of from about 1 atmosphere to about 1500 pounds, in the presence of a complex catalyst consisting eseentially of rhodium-corbonyl-tri - n - butylphosphine complex.

References Cited by the Examiner

UNITED STATES PATENTS

| | | | |
|---|---|---|---|
| 2,327,066 | 8/1943 | Roelen | 260—604 X |
| 2,437,600 | 3/1948 | Gresham et al. | 260—604 |
| 2,548,159 | 4/1951 | Houtman et al. | 260—604 |
| 2,880,241 | 3/1959 | Hughes | 260—604 |
| 3,081,357 | 3/1963 | Alderson et al. | 260—604 |
| 3,102,899 | 9/1963 | Cannell | 260—439 |
| 3,150,188 | 9/1964 | Eisenmann et al. | 260—604 X |

LEON ZITVER, *Primary Examiner.*

B. HELFIN, R. H. LILES, *Assistant Examiners.*